United States Patent [19]

Gianella et al.

[11] Patent Number: 4,863,316
[45] Date of Patent: Sep. 5, 1989

[54] CLOSED LOOP POWDER FLOW REGULATOR

[75] Inventors: Edward P. Gianella, Teaneck, N.J.; Gregory Garistina, Bay Shore, N.Y.

[73] Assignee: The Perkin-Elmer Corporation, Norwalk, Conn.

[21] Appl. No.: 68,988

[22] Filed: Jul. 1, 1987

[51] Int. Cl.⁴ ............................................. B65G 51/16
[52] U.S. Cl. ........................................ 406/14; 406/15; 406/30
[58] Field of Search ...................... 406/12, 14, 15, 30, 406/17, 23, 93, 94, 95, 118, 137, 138

[56] References Cited

U.S. PATENT DOCUMENTS

| | | | |
|---|---|---|---|
| 3,599,832 | 8/1971 | Smith | 406/30 |
| 3,776,599 | 12/1973 | Reuter | 406/15 |
| 4,284,032 | 8/1981 | Moos et al. | 118/684 |
| 4,490,077 | 12/1984 | Shimada et al. | 406/14 |
| 4,521,139 | 6/1985 | Kretschmer et al. | 406/138 |
| 4,582,254 | 4/1986 | Rotolico et al. | 406/118 |

FOREIGN PATENT DOCUMENTS 642601 4/1984 Switzerland .

Primary Examiner—Sherman D. Basinger
Assistant Examiner—Thomas J. Brahan
Attorney, Agent, or Firm—E. T. Grimes; H. S. Ingham

[57] ABSTRACT

A powder feeding system includes closed loop regulation of powder feed rate. A feed gas is discharged under constant pressure into an enclosed hopper. A valve is disposed to constrict a carrier conduit conveying powder in a carrier gas. A load cell measures the rate at which powder is flowing from the hopper through an intake orifice into the carrier conduit, and filtered flow rate signal is produced. A first controller produces a reference signal representative of the difference between a set point signal and the flow rate signal. A differential signal is produced corresponding to the pressure difference between the hopper pressure and a carrier conduit pressure taken between the intake orifice and the valve. A second controller produces a control signal representative of the difference between the differential signal and the reference signal. The valve is responsive to the control signal to proportionately constrict the carrier gas stream such as to regulate the powder flow rate. Preferably the time constant of the second controller is faster than the time constant of the first controller.

17 Claims, 1 Drawing Sheet

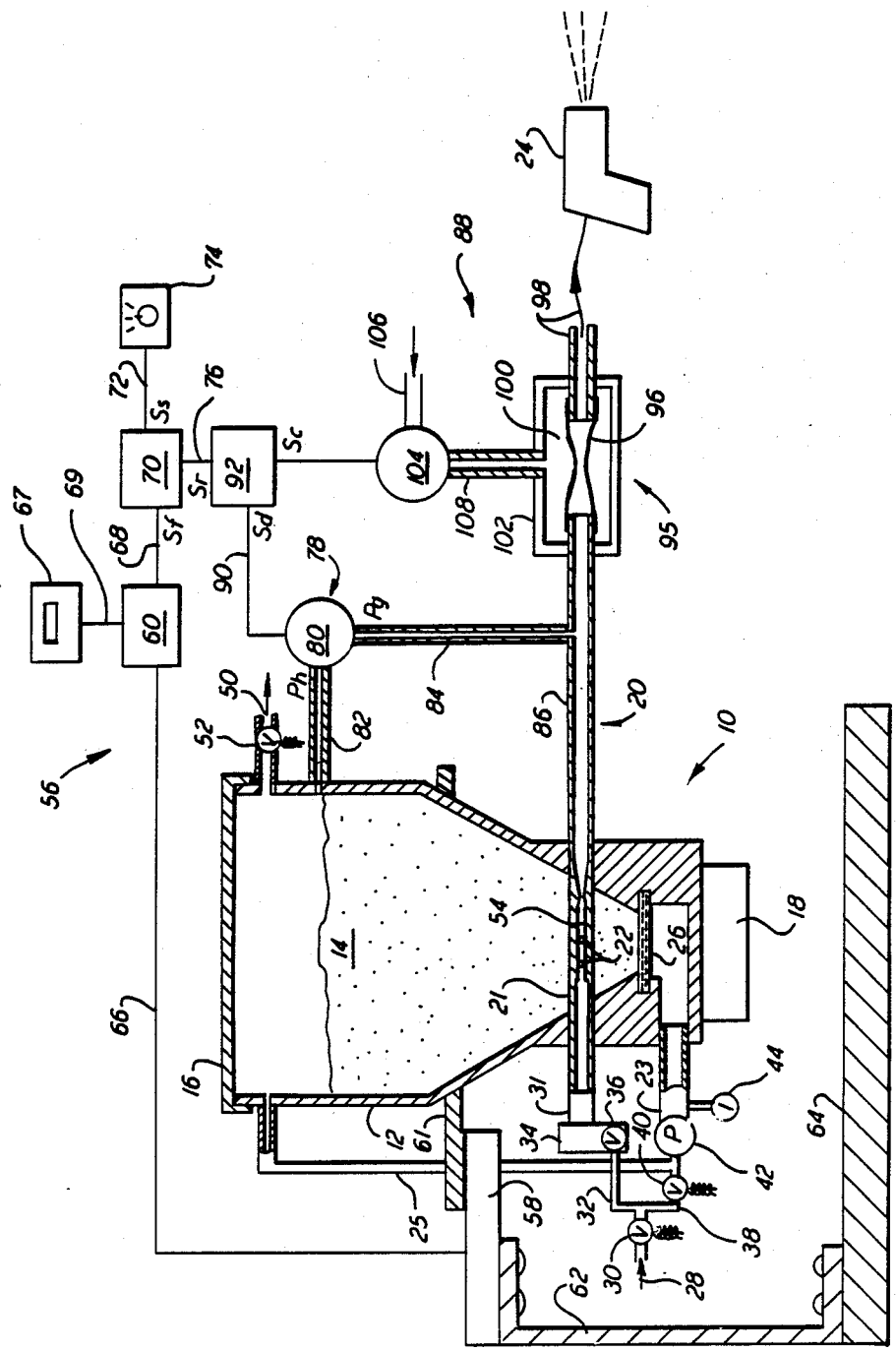

CLOSED LOOP POWDER FLOW REGULATOR

The present invention relates to a powder feeding system having closed loop regulation of powder flow rate.

BACKGROUND OF THE INVENTION

Thermal spraying, also known as flame spraying, involves the heat-softening of heat-fusible material, such as a metal or ceramic, and the propelling of the softened material in particulate form against a surface to be coated to which the heat-fusible material bonds. A thermal spray gun is usually used for this purpose and, with one type, the heat-fusible material is supplied in powder form to the gun. The powder is of quite small particle size, e.g., below about 100 mesh U.S. Standard screen size to as small as one micron, and is difficult to meter and control.

A thermal spray gun normally utilizes a combustion or plasma flame to effect melting of the powder, but other heating means, such as electric arcs, resistance heaters or induction heaters can also be used, alone or in combination. In a powder-type combustion thermal spray gun, the carrier gas for the powder can be one of the combustion gases or compressed air. In a plasma spray gun, the carrier gas is generally the same as the primary plasma gas, although other gases such as hydrocarbon are used in special cases.

To obtain high quality coatings, it is necessary to accurately control the rate at which the powder is fed through the gun and to maintain the rate constant for a given set of spray conditions. The type of fine powder used is a very difficult material to handle and to feed with any uniformity into a carrier gas. While various apparatus of different designs and modes of operation based on gravity, mechanical and gas conveying, and combinations thereof, have been proposed such devices almost universally suffer from a lack of reliability in maintaining a constant controlled powder feed rate and are often subject to mechanical wear and breakdown. A contributing factor is the wide range of powder sizes, materials and particle shapes used for thermal spraying.

The present invention pertains to and utilizes a powder feeder broadly of the type described in U.S. Pat. No. 4,561,808. This patent discloses a powder feeding system comprising an enclosed hopper for containing powder in loose particulate form. A carrier gas conduit connected to a carrier gas supply extends through the hopper in its lower portion and continues to a point of powder-carrier gas utilization. The carrier gas conduit has therein powder intake orifices which extend into the hopper below the level of the powder and have a geometric design and arrangement such that there is no gravity flow of the powder therethrough into a carrier gas stream in the carrier gas conduit in the absence of a fluidizing gas flow therethrough.

Fluidizing feed gas at a regulated pressure is supplied to the hopper so that in passing to the orifice the gas must pass through the mass of solids and be diffused thereby. The design of the hopper is such that the gas converges towards the powder intake conduit and fluidizes the powder in a fluidized zone in the immediate vicinity thereof, the powder surrounding the fluidized zone being non-fluidized and acting as a diffusion region for introducing the fluidized gas uniformly into the fluidized zone.

As further disclosed in U.S. Pat. No. 4,561,808, the carrier gas is supplied in a predetermined, constant amount. The flow of the feed gas is regulated by the pressure in the carrier gas conduit, which pressure is responsive to the mass flow rate of solids therethrough. The change in the pressure in the conveying gas line, if any, regulates the flow of the fluidizing gas. Since feed gas pressure is constant, if the carrier conduit pressure should increase, the flow of the fluidizing gas is made to decrease, and vice versa.

It has been found that the type of system of U.S. Pat. No. 4,561,808 has excellent repeatability and uniform control of the powder feed rate and has proven to perform significantly better than predecessor feeders. For example, powder flow rate can be maintained within about 5%. However, for some applications, substantially better precision is required.

Various other devices have been utilized for sensing and controlling powder flow rate by the use of closed loop feedback. For example, U.S. Pat. No. 3,976,332, which discloses a predecessor to the feeder of aforementioned U.S. Pat. No. 4,561,808, teaches the use of a fluidic amplifier that supplies the feed gas to the hopper at a rate controlled by pressure in the carrier conduit. U.S. Pat. No. 2,623,793 discloses a differential pressure controller which detects differential pressure between a powder-gas separator and a gas supply tube at the bottom of a powder-gas lift pipe. The differential pressure controller operates a control valve which supplies gas to a feeder.

U.S. Pat. No. 3,365,242 teaches coarse control of powder flow by adjusting pressure in the gas space above the powder in a tank. Fine control of powder discharge is brought about by a valve which supplies gas to a main powder discharge line. The valve is operated by a pressure response actuator which senses the pressure at the discharge line. As an alternative, instead of pressure monitored discharge rate of powder, a weighing apparatus is mentioned in the patent for delivering a signal responsive to flow of powder.

Other methods are known for measuring powder feed rate. For example, U.S. Pat. No. 4,613,259 discloses the detection of nuclear radiation passed through a tube carrying powder. The detector signal is processed by a computer which controls a mechanical metering device on the feeder. This patent also describes the separate use of a rubber tubing pinch valve for shutting the powder carrier gas flow on and off. The tubing is surrounded by a chamber filled with a fluid at high pressure to pinch off the tube and prevent flow.

German Patent Application 3,211,712 discloses, in tandem, a pair of powder hoppers, a feeding device with an adjustable feed rate, a storage chamber, a variable gap gravity feed from the storage chamber, and a carrier gas injector. Powder falls into the injector through the preset gap. A control device detects the height of the powder in the storage chamber and regulates the feeding device to maintain constant height.

Copending U.S. patent application Ser. No. 927,012 filed Nov. 4, 1986, assigned to the same assignee as the present application, discloses a particular use of a load cell for measuring powder flow rate. An analog signal from the load cell reflects the weight of the hopper containing the powder. The analog signal is conditioned by circuitry which differentiates the signal to a rate of change, filters out transient signals and provides a suitably scaled output for feed rate indication. Time constant is normally of the order of several seconds to one minute in order to prevent clutter by extraneous transients, and the circuitry provides for quick response to major changes in flow rate. This system provides an excellent measure of average flow rate, but the time constant is too long to be utilized alone in a feedback loop where rapid control of powder flow fluctuations is desired.

Therefore an object of the present invention is to provide an improved powder feeding system and method having a high degree of regulation of powder flow rate with a quick response time.

A further object is to provide novel closed loop regulation of powder flow rate in a powder feeding system of the type having a carrier conduit with an intake orifice for entraining powder from a hopper in the presence of feed gas to the hopper.

BRIEF DESCRIPTION OF THE INVENTION

The foregoing and other objects are achieved with a powder feeding system with closed loop regulation of powder feed rate, comprising a powder feeder including an enclosed hopper for a powder, a feed gas conduit adapted to discharge a feed gas under constant pressure into the hopper, a carrier conduit for a carrier gas stream, and intake orifice means for entraining powder at an actual flow rate from the hopper into the carrier conduit in the presence of the feed gas pressure. The carrier conduit is connected to a carrier gas supply and extends to a point of powder carrier gas utilization.

According to the present invention pressure means for varying pressure in the carrier conduit, such as valve means, are disposed in the carrier conduit between the intake orifice means and the point of utilization for varying conduit pressure as by constricting the carrier gas stream by an adjustable amount. Control of the pressure means will control the powder flow rate.

Set point means generate a selected set point signal representing a selected powder flow rate. Flow measuring means measure the actual rate at which powder is flowing from the hopper and produces a corresponding flow rate signal. A first controller means produces a reference signal representative of the difference between the set point signal and the flow rate signal.

A pressure measuring means measures carrier conduit pressure, preferably as a pressure difference between hopper pressure and carrier conduit pressure taken between the intake orifice and the valve means. The pressure measuring means produces a differential signal corresponding to the pressure difference. A second controller means produces a control signal representative of the difference between the differential signal and the reference signal; i.e., the sum of the carrier pressure and the reference signal. The valve means are responsive to the control signal to proportionately constrict the carrier gas stream such as to regulate the powder flow rate.

The flow measuring means has a first time constant in regulating the powder flow rate in response to a change therein. The pressure measuring means has a second time constant in regulating the powder flow rate in response to a change therein. The present invention is especially useful where the second time constant is faster than the first time constant.

BRIEF DESCRIPTION OF THE DRAWING

The drawing is a side view in vertical section of a powder feeder combined with a schematic of a closed loop system according to the present invention.

DETAILED DESCRIPTION OF THE INVENTION

A powder feeder 10 used in conjunction with the present invention is of the type described in aforementioned U.S. Pat. No. 4,561,808. With reference to the drawing, a supply hopper 12 contains powder 14 such as a ceramic powder having a particle size predominantly in the range of −325 mesh (U.S. Standard Sieve) to +5 microns. The hopper has an inlet cover 16 for the periodic addition of powder. It can be equipped with a vibrator 18 which is used, as necessary, to maintain the powder in loose free-flowing form and permeable to the passage of gas. The hopper is capable of being pressurized and is appropriately sealed with o-rings or the like (not shown).

Passing through the bottom portion of hopper 12 is a carrier gas conduit 20. Carrier gas may be an inert gas such as argon or nitrogen, or compressed air, or a hydrocarbon such as methane, or the like. Conduit 20 has a pickup section 21 with one or more powder intake orifices 22 (two shown) within the hopper below the level of the powdered solids. The intake orifice means is arranged so that there is no gravity flow of powder therethrough in the absence of a feed gas flow through the orifices, being, for example, downward or sideways facing or shielded from gravity flow by an overhang or the like. Optionally there may be a plurality of conduits 20 (although only one is shown) passing through the powder in parallel and converging into a single feeding section 86 of the carrier conduit extending from hopper 12.

Fluidizing feed gas, generally the same type as the carrier gas, is admitted to the hopper, preferably at a point external to any zone of fluidization of the solids in the immediate vicinity of intake orifices 22. As shown, the feed gas is admitted to the bottom of hopper 12 by a tube 23 and passes through a porous member 26 and the static mass of solids 14 to the intake orifices. A portion of the fluidizing feed gas preferably is also introduced by way of a branch tube 25 connected near the top of hopper 12 above the normal maximum level of powder. Powder is entrained by the feed gas through orifices 22 and into carrier conduit 20 where the carrier gas entrains the feed gas and conveys the powder to a point of utilization such as a thermal spray gun 24 or merely an open discharge of powder. The powder flow rate is proportional to the feed gas rate of flow through orifices 22 which, in turn, is proportional to the pressure differential between the hopper and the carrier conduit. In an alternative embodiment (not shown) there is no separately supplied carrier gas, and the feed gas alone carries the powder in the carrier conduit.

Gas is supplied to the system from a gas source (not shown) by way of inlet conduit 28 which has a solenoid shut-off valve 30 therein. A portion of the gas is passed to an inlet section 31 of carrier gas conduit 20 via a branch conduit 32 and a flowmeter 34 which has a control valve 36 for metering a desired, constant mass flow rate of gas through carrier gas conduit 20. Optionally, a highly constant carrier flow may be effected with a gas flow rate transducer (not shown) in conduit section 31 and a feedback loop to control valve 36.

A second and smaller portion of the gas supply is passed through a second branch conduit 38, a second solenoid shut-off valve 40 and a piloted pressure regulator 42 into feed gas conduit 23. Pressure regulator 42 is preset to maintain a supply of feed gas into the hopper at a relatively low, constant pressure, for example, in the range of 0.07 to 0.7 bar (1 to 10 psig). A pressure gage 44 connected to feed gas conduit 23 may be provided to indicate pressure as well as serve as a relative indicator of powder feed rate.

A vent 50 near the top of hopper 12 is used to vent the hopper when the feed gas is shut off. A solenoid valve 52 is provided for the purpose.

To start, the system valve 30 is opened (or a regulator adjusted to the desired pressure) to commence flow of carrier gas. Feed gas valve 40 is opened and simultaneously vent valve 52 is closed. Pressure in hopper 12 builds up rapidly and powder is entrained through intake orifices 22 and carried into the axial bore 54 of pickup section 21 of carrier conduit 20 whereby a mixture of carrier gas, feed gas and powder travel through the carrier conduit to the thermal spray gun. To stop the operation, the procedure is reversed; vis. valve 40 is turned off and vent valve 52 is opened.

According to the present invention, powder flow rate measuring components are part of a flow control loop 56. Rate is measured by any known or desired method which produces an electrical signal with a time constant that should be in the range of 0.5 to 5 seconds and preferably 1 to 3 seconds. Such time constant is desirable for presenting flow rate per se without short-time fluctuations, and may be inherent for suitable flow measuring devices.

Desirably the flow rate is detected by a strain gauge based force transducer such as a conventional load cell 58 in conjunction with an electronic signal conditioner 60 such as is taught in aforementioned U.S. patent application Ser. No. 927,012. Hopper 12 is hung on a holder 61 attached to the load cell. The load cell is rigidly attached to a bracket 62 on a base support 64 and outputs on line 66 a low level electrical analog signal on the order of 0-20 VDC, which is proportional to the weight of hopper 12 containing the powder.

When the carrier gas and feed gas are turned on, material flows from the hopper into carrier conduit 20 and thence to the spray gun 24 or other point of utilization. This causes the hopper weight, and consequently the load cell output, to decrease with time. The output from the load cell is routed through line 66 to signal conditioner 60 which differentiates the analog signal, filters out transient signals and produces a flow rate signal Sf which is proportional to the rate of powder flow, generally in the range of up to 10 VDC. Filtering is necessary to eliminate signals from the load cell due to external causes such as vibrations and motions, and results in a time constant such as 0.5 to 5 seconds, preferably in the 1 to 3 second range. Flow rate may be shown on a display 67 through line 69.

According to the present invention, the flow rate signal Sf is sent via line 68 to a first controller means 70. A second signal is also received by the controller via line 72 from a set point means 74 which generates a set point signal voltage Ss for comparison with the flow rate signal Sf. The set point means is generally conventional and, for example, may comprise a voltage regulator with a variable potentiometer or a digital-analog converter and is adjustable to represent a selected powder flow rate.

The output of controller 70 on line 76 is a reference signal Sr representative of an error signal difference (Ss−Sf) between set point Ss and flow rate signal Sf. In general signal Sr comprises a term proportional to the error signal and may also include at least one additional term derived from the error signal. Controller 70 is preferably a conventional reverse acting process controller with an output reference signal Sr on line 76 that is the sum of a term proportional to the error signal and an integral term of the error signal. At steady state the error signal is zero, and the reference signal of the present embodiment ranges up to 5 VDC.

Further to the present invention, a second control loop, vis. a pressure control loop 78 is integrated with the above-described components of flow control loop 56. The pressure control loop includes a differential pressure transducer 80 which measures the difference (Ph−Pg) between the feed gas pressure Ph in the hopper, which is detected via a first tube 82, and carrier conduit pressure Pg. The carrier conduit pressure is taken via a second tube 84 from feeding section 86 of conduit 20 that is between the intake orifice system 22 and a valve means 88 described below. Typically hopper gauge pressure is between 1 and 10 psi (0.07−0.7 bar) and carrier conduit gauge pressure is between zero and 5 psi (0−0.3 bar). The pressure difference (Ph−Pg) is a measure of powder flow rate including short-time fluctuations.

Pressure transducer 80 supplies a differential signal Sd in the form of a voltage on line 90 of about 1 to 6 VDC, corresponding to the pressure difference (Ph−Pg). Transducer 80 has a quick time constant less than that of the flow measuring means 58,60; e.g. less than 0.1 seconds and preferably less than 0.01 seconds.

A second controller means 92 is receptive of the differential signal Sd on line 90 and the reference signal Sr on line 76. Thus Sr acts as a second set point signal. The output of the second controller 92 on line 94 is a control signal Sc of about zero to 60 mA DC that is representative of a second error signal proportional to the difference (Sd−Sr) between differential signal Sd and reference signal Sf. Signal Sc may, for example, be proportional to the second error signal. However, preferably controller 92 is a conventional direct acting process controller with an output control signal Sc on line 94 that is the sum of a second term proportional to the second error signal and a second integral term of the second error signal.

A pressure means such as valve means 88 is responsive to control signal Sc to adjustably vary the pressure in carrier conduit 20. Valve 88 does so by constricting the carrier gas and powder flow in carrier conduit 20. The valve means does not of itself change powder flow rate significantly but rather operates as a means to vary back pressure to influence the pressure differential (Ph−Pg), thus controlling flow rate indirectly. It also may be desirable, within the present invention, to control powder flow rate for the type of feeder described herein by manually adjusting the pressure means, vis. valve 88.

The controllers 70,92 may be formed of analog electronic components such as operational amplifiers or may be implemented with a digital computer in the known or desired manner.

As described above, the reference signal and the control signal are derived from respective error signals. The constant for the proportional term is typically from 0.1 to 1.5, and the integral constant is from 1 to 8 seconds for the first controller and 0.5 to 4 seconds for the second controller. Specific settings can readily be established by routine experimentation and be optimized for a wide range of carrier conduit sizes and lengths, types of powders, ranges of flow rates and any back pressure from the point of utilization.

Although differential transducer 80 is preferred, in a simpler embodiment conduit 82 is omitted and the transducer merely measures carrier conduit pressure via conduit 84. In this case signal Sg corresponds inversely to the carrier conduit pressure and thus may be used as input to controller 92 to produce control signal Sc. Operation is otherwise similar, albeit with slightly less precision, since hopper pressure is held substantially constant by the constant feed gas pressure.

In a preferred embodiment of the present invention, valve means 88 includes a valve 95 (shown larger than scale with respect to other components in the drawing). The valve is most preferably in the form of a constrictable tube 96 of resilient material such as rubber or the like connected generally between orifices 22 and spray gun 24, specifically between tap conduit 84 and a utilization section 98 of conduit 20 to spray gun 24. A sealed annular fluid pressure chamber 100 formed by a valve body 102 surrounds the rubber tube. Such a rubber valve is chosen as being minimally effected by abrasive powders.

To effect valve control by the control signal Sc, valve means 88 further includes a current-to-pneumatic transducer 104 which receives the control signal on line 94. The transducer also receives, via tube 106, pressurized fluid from a source (not shown) such as compressed air or gas from the supply to the feeder. Transducer 104 supplies the fluid through tube 108 to chamber 100, at a pressure corresponding to the control signal Sc. Thus, for example, an increase in control signal voltage causes an increased pressure to the chamber and a resulting constriction of rubber tube 96.

The set point voltage Ss from set point means 74 is reduced by the flow rate signal voltage Sf so that (for example) an undesirable reduction in powder flow rate results in a transition to a low flow rate signal, which causes the first controller to generate a relatively high reference signal Sr in proportion to difference (Ss−Sf). This high reference signal is subtracted by the second controller from the differential signal Sd produced by the pressure transducer, to effect a relatively low control signal. Therefore, the low powder flow rate results in a relatively low control signal proportional to the difference (Sd−Sr) to open valve 95 to increase the pressure differential thus increasing flow rate in response. Also, consequently, a decrease in pressure difference (due to low flow) acts to decrease control signal Sc and thereby increase powder flow. Similarly, if flow rate is too high, the resulting high control signal will constrict valve 95 and decrease the pressure differential to decrease powder flow.

Thus the two control loops 56,78 function cooperatively, with the first loop 56 controlling the basic feed rate. For example, initially flow controller 74 is set for a desired set point signal Ss. With only carrier gas flowing, both hopper pressure and powder flow rate are zero. When the feed system is started by turning on feed gas, hopper pressure increases to a value that is preset with regulator 42 at a level known to produce more powder flow than desired. While the powder flow signal Sf is below set point Ss, first controller 70, which is forward acting, sends a relatively high reference signal to second controller 92. Because second controller 92 is reverse acting, it sends a low control signal to control valve 88 which is driven wide open. As the powder flow rate signal approaches set point, the first controller reduces the second controller's reference signal Sr. At this stage, the pressure difference Ph−Pc as measured by the differential pressure transducer 80 will produce a differential signal Sd higher than reference signal Sr. With the resulting increase in control signal Sc, control valve 88 will begin to close, thus reducing Ph−Pg and consequently powder flow rate.

The second control loop 78 regulates out the smaller fluctuations in flow rate. For example, a quick increase in powder flow is accompanied by a decrease in carrier pressure with respect to hopper pressure which is constant. Signal Sd to controller 92 increases and control signal Sc thereby increases. (Due to longer time constant reference signal Sr remains unchanged.) Thus valve 95 is further constricted by an amount that will increase carrier gas pressure enough to bring the flow rate down to the proper level, cancelling the fluctuation.

The cascaded control loops of the present invention are especially desirable where the time constant of the filtered powder flow transducer is much longer (e.g., 0.5 to 5 seconds) than the time constant of the carrier pressure (less than 0.1 seconds). Because the volume of the carrier conduit sections between control valve 95 and hopper 12 is small, second controller 92 can be tuned for very rapid response to pressure variations and thus maintain constant powder flow over short time intervals. First controller 70 is tuned for slower response as dictated by the time constant of the powder flow transducer 58 and signal conditioner 60. Controller 70 in loop 56 has several functions: (a) it provides an initial set point for pressure controller 92 which holds power flow rate at the desired value, (b) it eliminates powder flow rate drift due to changes in material composition, pickup shaft wear, changes in carrier flow, etc., and (c) it changes the reference signal to the second controller in response to changes in powder flow rate set point. Pressure control loop 78, with its quick time constant, then operates to compensate for minor changes and fluctuations in flow, and maintain constant flow. The feeding system of the present invention maintains powder flow rate within 1 g/min of the set point rate and typically about 0.25 g/min, from full to nearly empty hopper. Actual feed rates are from about 2 g/min to over 200 g/min, typically 50 g/min to 100 g/min.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. In a powder feeding system including in combination an enclosed hopper for a powder, feed gas means for discharging a feed gas at a feed gas rate into the hopper, a carrier conduit for a carrier gas stream extending to a point of utilization, and intake means for entraining powder at a powder flow rate from the hopper into the carrier conduit corresponding to the feed gas rate, a closed loop regulator of powder flow rate comprising:

a first control loop having a first time constant in response to a change in powder flow rate, comprising flow measuring means for measuring the powder flow rate and a first controller means operatively connected to the flow measuring means for controlling the feed gas rate in response to measurement of the powder flow rate such as to correspondingly control the powder flow rate; and a second control loop having a second time constant in response to the change in powder flow rate, comprising pressure measuring means for measuring carrier conduit pressure between the intake orifice means and the point of utilization and second controller means operatively connected to the pressure measuring means for controlling the feed gas rate in response to measurement of the carrier conduit pressure such as to correspondingly control the powder flow rate, the first time constant being longer than the second time constant.

2. In a powder feeding system including in combination an enclosed hopper for a powder, a feed gas conduit adapted to discharge a feed gas under constant pressure into the hopper, a carrier conduit for a carrier gas stream, and intake orifice means for entraining powder at a flow rate from the hopper into the carrier conduit in the presence of the feed gas pressure, the carrier conduit being connected to a carrier gas supply and extending to a point of powder carrier gas utilization, a closed loop regulator of powder flow rate comprising:

a first control loop having a first time constant in response to a change in powder flow rate, comprising set point means for generating a set point signal representing a selected powder flow rate, flow measuring means for producing a flow rate signal corresponding to the powder flow rate, first controller means for producing a reference signal representative of the difference between the set point signal and the flow rate signal, and pressure means disposed in the carrier conduit between the intake orifice means and the point of utilization for varying carrier gas pressure, the pressure means being responsive of the reference signal to correspondingly vary the carrier gas pressure such as to regulate the powder flow rate; and a second control loop having a second time constant in response to a change in powder flow rate, comprising pressure measuring means for measuring carrier conduit pressure between the intake orifice means and the pressure means and for producing a pressure signal corresponding to the carrier conduit pressure, second controller means for producing a control signal responsive of the pressure signal, and the pressure means, the pressure means being responsive of the pressure signal to correspondingly vary the carrier gas pressure such as to correspondingly regulate the powder flow rate, and the first time constant being longer than the second time constant.

3. A powder feeding system according to claim 2 wherein the first time constant is between 0.5 and 5 seconds and the second time constant is less than 0.1 seconds.

4. A powder feeding system according to claim 2 wherein the first control loop and the second control loop are cascaded.

5. A powder feeding system according to claim 2 wherein the pressure means comprises valve means for constricting the carrier gas stream.

6. A powder feeding system according to claim 5 wherein the valve means comprises a constrictable tube disposed as a section of the carrier conduit between the intake orifice means and the point of utilization, a valve body sealingly cooperative with the constrictable tube to form a pressure chamber surrounding the compressible tube, and transducer means for producing a fluid pressure corresponding to the control signal, the pressure chamber being receptive of the fluid pressure to correspondingly constrict the constrictable tube and thereby the carrier gas stream.

7. In a powder feeding system including in combination an enclosed hopper for a powder, a feed gas conduit adapted to discharge a feed gas under constant pressure into the hopper, a carrier conduit for a carrier gas stream, and intake orifice means for entraining powder at a flow rate from the hopper into the carrier conduit in the presence of the feed gas pressure, the carrier conduit being connected to a carrier gas supply and extending to a point of powder carrier gas utilization, a closed loop regulator of powder flow rate comprising:

set point means for generating a set point signal representing a selected powder flow rate, flow measuring means for producing a flow rate signal corresponding to the powder flow rate, first controller means for producing a reference signal representative of the difference between the set point signal and the flow rate signal, pressure means disposed in the carrier conduit between the intake orifice means and the point of utilization for varying carrier gas pressure, pressure measuring means for measuring carrier conduit pressure between the intake orifice and the pressure means and for producing a pressure signal corresponding to the carrier conduit pressure, and second controller means for producing a control signal representative of a combination of the pressure signal and the reference signal, the pressure means being responsive of the control signal to correspondingly vary the carrier gas pressure such as to regulate the powder flow rate.

8. A powder feeding system according to claim 7 wherein the flow measuring means has a first time constant in response to a change in powder flow rate, the pressure measuring means has a second time constant in response to a change in powder flow rate, and the first time constant is longer than the second time constant.

9. A powder feeding system according to claim 8 wherein the first time constant is between 0.5 and 5 seconds and the second time constant is less than 0.1 seconds.

10. A powder feeding system according to claim 9 wherein the flow measuring means comprises means for producing an analog signal representing the weight of the hopper and powder therein and conditioning means receptive of the analog signal for differentiating, filtering and scaling the same to obtain the flow rate signal.

11. In a powder feeding system including in combination an enclosed hopper for a powder, a feed gas conduit adapted to discharge a feed gas under constant pressure into the hopper, a carrier conduit for a carrier gas stream, and intake orifice means for entraining powder at a flow rate from the hopper into the carrier conduit in the presence of the feed gas pressure, the carrier conduit being connected to a carrier gas supply and extending to a point of powder carrier gas utilization, a closed loop regulator of powder flow rate comprising:

set point means for generating a set point signal representing a selected powder flow rate, flow measuring means for producing a flow rate signal corresponding to the powder flow rate, first controller means for producing a reference signal representative of the difference between the set point signal and the flow rate signal, valve means disposed in the carrier conduit between the intake orifice means and the point of utilization for constricting the carrier gas stream by an adjustable amount, pressure measuring means for measuring pressure difference between the gas feed pressure in the hopper and a carrier conduit pressure taken between the intake orifice and the valve means, the pressure measuring means producing a differential signal corresponding to the pressure difference, and second controller means for producing a control signal representative of the difference between the differential signal and the reference signal, the valve means being responsive of the control signal to correspondingly constrict the carrier gas stream such as to regulate the powder flow rate.

12. A powder feeding system according to claim 11 wherein the first controller means comprises a reverse acting process controller that determines a first error signal proportional to the difference between the set point signal and the flow rate signal and produces the reference signal as a sum of a first proportional term proportional to the error signal and a first integral term of the first error signal, and the second controller means comprises a direct acting process controller that determines a second error signal proportional to the difference between the differential signal and the reference signal and produces the control signal as the sum of a second proportional term proportional to the second error signal and a second integral term of the second error signal.

13. A powder feeding system according to claim 11 wherein the valve means comprises a constrictable tube disposed as a section of the carrier conduit between the intake orifice means and the point of utilization, a valve body sealingly cooperative with the constrictable tube to form a pressure chamber surrounding the compressible tube, and transducer means for producing a fluid pressure corresponding to the control signal, the pressure chamber being receptive of the fluid pressure to correspondingly constrict the constrictable tube and thereby the carrier gas stream.

14. A powder feeding system comprising, in combination, an enclosed hopper for a powder, feed gas means for discharging a feed gas at a feed gas rate into the hopper at constant pressure, a carrier conduit for a carrier gas stream connected to a carrier gas supply and extending to a point of powder carrier gas utilization, orifice means for entraining powder at a powder flow rate from the hopper into the carrier conduit in the presence of the feed gas pressure, and pressure means disposed in the carrier conduit between the intake orifice means and the point of utilization for controlling carrier gas back pressure in the carrier conduit such as to control the powder flow rate cooperatively with the constant pressure of the feed gas.

15. A powder feeding system according to claim 14 wherein the pressure means comprises valve means for constricting the carrier gas stream.

16. A powder feeding system according to claim 15 wherein the valve means comprises a constrictable tube disposed as a section of the carrier conduit between the intake orifice means and the point of utilization, a valve body sealingly cooperative with the constrictable tube to form a pressure chamber surrounding the compressible tube, and transducer means for producing a fluid pressure corresponding to the control signal, the pressure chamber being receptive of the fluid pressure to correspondingly constrict the constrictable tube and thereby the carrier gas stream.

17. In a powder feeding system including in combination an enclosed hopper for a powder, a feed gas conduit adapted to discharge a feed gas under constant pressure into the hopper, a carrier conduit for a carrier gas stream, and intake orifice means for entraining powder at a flow rate from the hopper into the carrier conduit in the presence of the feed gas pressure, the carrier conduit being connected to a carrier gas supply and extending to a point of powder carrier gas utilization, a method of closed loop regulation of powder flow rate comprising:

generating a set point signal representing a selected powder flow rate, measuring powder flow rate, producing a flow rate signal corresponding to the powder flow rate, producing a reference signal representing the difference between the set point signal and the flow rate signal, separately measuring carrier conduit pressure in a conduit section of the carrier conduit between the intake orifice means and the point of utilization, producing a pressure signal corresponding to the carrier conduit pressure, producing a control signal representing a combination of the pressure signal and the reference signal, and varying the carrier gas back pressure in the conduit section in response to the control signal such as to regulate the powder flow rate cooperatively with the constant pressure of the feed gas.

* * * * *

UNITED STATES PATENT OFFICE
CERTIFICATE OF CORRECTION

Patent No. 4,863,316      Dated September 5, 1989

Inventor(s) E. P. Gianella, et al

It is certified that error appears in the above-identified patent and that said Letters Patent is hereby corrected as shown below:

On the title page Item [75] should read as follows:

Inventors: -- Edward P. Gianella, Teaneck, N. J.;
Gregory Garistina, Bay Shore;
Mark F. Spaulding, Yaphank, both of N.Y.

Signed and Sealed this

Ninth Day of October, 1990

Attest:

HARRY F. MANBECK, JR.

*Attesting Officer*       *Commissioner of Patents and Trademarks*